Oct. 30, 1928.
L. M. ASPINWALL
1,689,849
ELECTRICAL MEASURING INSTRUMENT
Filed Aug. 7, 1926
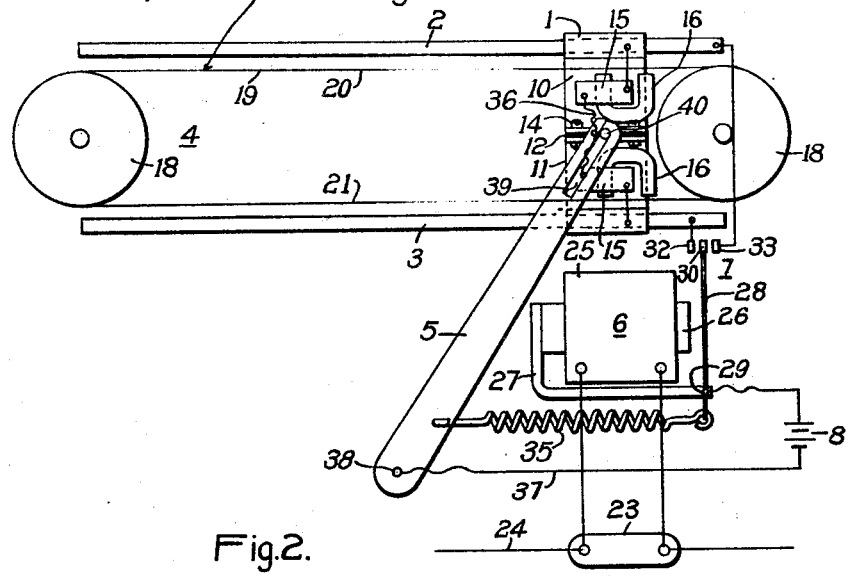
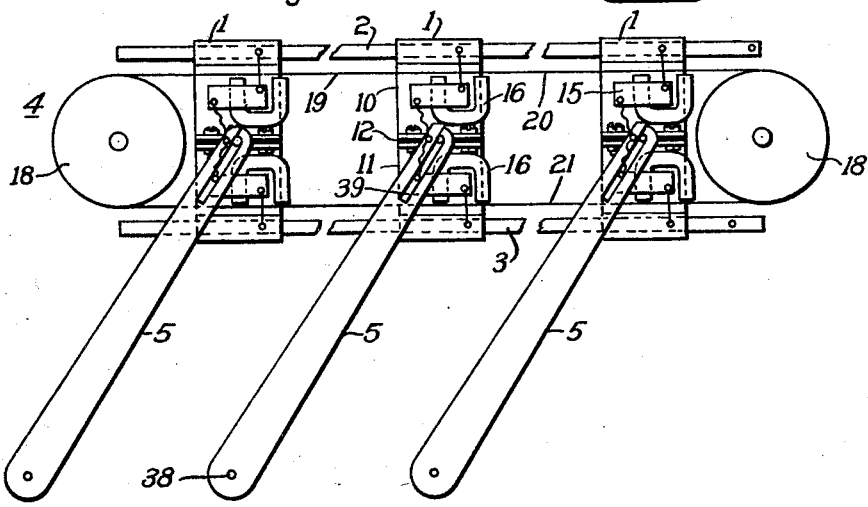
WITNESSES:
INVENTOR
Louis M. Aspinwall
BY
ATTORNEY Patented Oct. 30, 1928.

1,689,849

UNITED STATES PATENT OFFICE.

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed August 7, 1926. Serial No. 127,717.

My invention relates to electrical measuring instruments and particularly to instruments of the power-operated-relay type.

One object of my invention is to provide an instrument of the above indicated character that shall have a relatively great operating force, compared with the inertia of its moving parts.

Another object of my invention is to provide an instrument of the power-operated-relay type that shall have quicker and more positive action than similar instruments heretofore employed.

A further object of my invention is to provide an electrical measuring instrument that shall be simple and durable in construction, economical to manufacture and effective in its operation.

Heretofore, in electrical measuring instruments of the power-operated-relay type, it has been usual to employ a Kelvin balance, operable in response to the quantity to be measured, to control the circuit of a pilot motor which, in turn, actuates a screw shaft upon which is mounted a traveling nut or stylus carriage.

Such instruments, as well as others employing worm-screw and gear-wheel connections between the pilot motor and the stylus, are relatively slow in operation.

It is my aim to overcome the above mentioned objections and to so increase the speed of an instrument of the relay type that instantaneous changes of the quantity being measured may be more effectively indicated.

Accordingly, in practicing my invention, I provide a continuously-moving, relatively-high-speed element that is actuated independently of the quantity being measured but is always ready for an instantaneous and quick operation of an indicating member when variations occur in the quantity being measured.

Fig. 1 of the accompanying drawings is a diagrammatic view of an instrument embodying my invention, and Fig. 2 is a similar view of a modified form of my invention.

The device comprises, in general, a movable indicating member 1, guiding means, such as rods 2 and 3, for the indicating member 1, an endless-belt structure 4 for moving the member 1, an arm 5 for controlling the movement and position of the member 1, an actuating electromagnet 6, a switch 7 and a source of electromotive force 8, such as a battery.

The indicating member 1, which corresponds to the traveling nut or screw-operated pen carriage in instruments of the above mentioned type and normally carries a pen or stylus for co-operation with a record chart (not shown) is rectilinearly movable along the rods 2 and 3 and is divided into upper and lower sections 10 and 11 insulated from each other by a body of insulating material 12 and secured to each other, as by screws 14.

Each of the sections 10 and 11 carries an electromagnet comprising a coil 15 and a core member 16.

The endless-belt structure 4 comprises pulleys 18 that are connected by an endless belt 19, preferably in the form of steel tape. One of the pulleys 18 may be provided with suitable means, such as a synchronous motor, (not shown) for driving upper and lower elements 20 and 21 of the belt 19 in opposite directions parallel to the path of movement of the indicating member 1.

The actuating electromagnet 6, which is connected across a shunt 23 of a circuit 24 to measure the current of the latter, comprises a coil 25, a core member 26 and a supporting bracket 27 which may be of magnetizable material.

The switch 7 comprises an arm 28 pivotally mounted, as by a pin 29, to the bracket 27 and having a contact member 30, at one end, for co-operation with stationary contact members 32 and 33.

A spring 35 is connected between the arm 28 and the arm 5.

The battery 8 is connected to the coils 15 through the switch arm 28, the movable contact member 30 thereon, one of the stationary contact members 32 and 33, one of the rods 3 and 2, one of the coils 15, through a flexible conductor 36 to the control arm 5 and to the battery 8, through a conductor 37.

The control arm 5 is pivotally mounted on a stationary pivot pin 38 and has a slot 39 adjacent to its free end that cooperates with a pin 40 on the indicating member 1.

In operation, with the coil 25 of the electromagnet 6 energized in proportion to the current in the circuit 24, when the current increases in value, the arm 28 is attracted to the core member 26 to engage the contact members 30 and 32, thereby completing the above-described circuit of the battery 8 through the lower coil 15. This operation energizes the core member 16 which thereby attracts the lower element 21 of the belt 19 to move the indicating member 1 in one direction along the guide rods 2 and 3. This action moves the control arm 5 which thereby extends the spring 35 in a manner tending to disengage the contact members 30 and 32. When the tension in the spring 35 overcomes the attractive force of the core member 26 on the arm 28, the contact members 30 and 32 are disengaged and the indicating member 1 comes to rest in a position corresponding to the increased value of the current in the circuit 24.

Similarly, when the current in the circuit 24 falls below the above-indicated value, the spring 35 overcomes the attractive force of the core member 26 and causes the contact member 30 to engage the contact member 33, thereby energizing the upper coil 15 and the armature 16 to attract the upper element 20 of the belt 19. This operation moves the indicating member 1, in reverse direction, to a new position of balance between the attractive forces of the core member 26 and the spring 35 on the arm 28 in which the movable contact member 30 is in a neutral position between the stationary contact members 32 and 33.

In the form of my invention shown in Fig. 2, in which corresponding parts are designated by corresponding reference characters, the structure is substantially identical with that above described, with the exception that the pulleys 18 are considerably farther apart, and a plurality of the indicating members 1 and the associated parts thereof are provided for effecting a selective variety of correlated records.

By my invention, when a change in the quantity being measured occurs, the motion of the indicating member 1, instead of being received from a slowly-moving screw shaft or other mechanical means having a time lag, is substantially instantaneously received from the belt 19 which is moving at all times during the operation of the device to operate the indicating member 1.

The words "electrical quantity" used in the appended claims shall be understood to comprehend any electrical quantity, as, for example, current, difference of potential, power, frequency or power factor.

While I have shown and described particular forms of my invention, changes may be effected therein without departing from the spirit and scope thereof, as set forth in the appended claims.

I claim as my invention:

1. In an electrical measuring instrument, the combination with indicating means, of actuating means therefor comprising a continuously movable magnetizable element, and cooperating magnetic means for intermittently transmitting the movement of the element to the indicating means in response to variations in an electrical quantity.

2. In an electrical measuring instrument, the combination with a rectilinearly-movable indicating member, of actuating means therefor comprising a magnetizable element having portions movable in opposite directions along paths substantially parallel to the path of movement of the indicating member, and electromagnetic means responsive to variations in an electrical quantity to be measured for causing the elements to move the indicating member.

3. In an electrical measuring instrument, the combination with a rectilinearly-movable indicating member, of actuating means therefor comprising a belt of magnetizable material having portions movable in opposite directions along paths substantially parallel to the path of movement of the indicating member, and electromagnetic means responsive to variations in a quantity to be measured for causing the portions to move the indicating member.

4. The combination with a rectilinearly-movable member, of actuating means therefor comprising a magnetizable element movable along a path substantially parallel to the path of movement of said member, an electromagnet carried by said member and cooperating with said magnetizable element to move said member, and means for controlling the electromagnet, whereby it takes a position in accordance with the magnitude of an electrical quantity.

5. The combination with a rectilinearly-movable member, of actuating means therefor comprising a magnetizable element having portions movable in reverse directions along paths substantially parallel to the path of movement of said member, electromagnetic means carried by said member and cooperating with said element to move said member, and means for controlling said electromagnetic means, whereby it takes a position indicative of the magnitude of an electrical quantity.

6. In an electrical measuring instrument, the combination with a rectilinearly-movable indicating member, of actuating means therefor comprising an endless magnetizable belt having elements movable in opposite directions parallel to the path of movement of the indicating member, electromagnetic means carried by the member cooperating with said elements to move the member, a pivoted control arm having a lost-motion connection to said member for movement thereby, means opposing movement of said arm, and means responsive to an electrical quantity for controlling the energization of said electromagnetic means.

7. In an electrical measuring instrument, the combination with a rectilinearly-movable indicating member, of actuating means therefor comprising a magnetizable belt having elements movable in opposite directions parallel to the path of movement of the indicating member, electromagnetic means carried by the member cooperating with said elements to move the member, a pivoted control arm having a lost-motion connection to said member for movement thereby, a switch arm for controlling the energization of said electromagnetic means, means yieldably connecting said arms, and means responsible to an electrical quantity to be measured for actuating said switch arm.

8. An electrical measuring instrument comprising an indicating member, a rectilinearly movable member of magnetizable material having portions movable in opposite directions and magnetic means cooperating between said portions for moving the indicating member in response to variations of an electrical quantity in an electric circuit.

In testimony whereof, I have hereunto subscribed my name this 5th day of August, 1926.

LOUIS M. ASPINWALL.